United States Patent [19]

Copeland

[11] Patent Number: 4,769,631
[45] Date of Patent: Sep. 6, 1988

[54] METHOD, SYSTEM AND APPARATUS FOR MAGNETIC SURVEILLANCE OF ARTICLES

[75] Inventor: Richard L. Copeland, Boca Raton, Fla.

[73] Assignee: Sensormatic Electronics Corporation, Deerfield Beach, Fla.

[21] Appl. No.: 880,138

[22] Filed: Jun. 30, 1986

[51] Int. Cl.⁴ .............................................. G08B 13/24
[52] U.S. Cl. ..................................... 340/551; 340/572
[58] Field of Search .............................. 340/551, 572; 343/841–842

[56] References Cited

U.S. PATENT DOCUMENTS

| 3,938,044 | 2/1976 | Lichtblau | 340/572 X |
| 4,251,808 | 2/1981 | Lichtblau | 340/572 |
| 4,660,025 | 4/1987 | Humphrey | 340/572 |
| 4,686,516 | 8/1987 | Humphrey | 340/572 |

Primary Examiner—Joseph A. Orsino
Assistant Examiner—Thomas J. Mullen, Jr.
Attorney, Agent, or Firm—Robin, Blecker & Daley

[57] ABSTRACT

Surveillance of magnetically tagged articles in a control zone is effected in a noisy environment by so shielding an antenna establishing a front magnetic field in the control zone as to reduce field strength in the back field rearwardly of the control zone. Shield magnetic material has response to the field which is detectably distinct from tag material response to the field.

50 Claims, 7 Drawing Sheets

METHOD, SYSTEM AND APPARATUS FOR MAGNETIC SURVEILLANCE OF ARTICLES

FIELD OF THE INVENTION

This invention relates generally to article surveillance and pertains more particularly to methods, systems and apparatus for the detection of magnetically-tagged articles in unauthorized presence in a control zone.

BACKGROUND OF THE INVENTION

Currently commercialized article surveillance systems are generally of the low frequency magnetic type, radio frequency type or microwave electromagnetic-/electrostatic type. In the case of an expanded width control zone the installation choice has typically been based on either radio frequency or microwave transmission or combinations of both.

Where a control zone is of relatively narrow width, such as the checkout area for a supermarket or similar retail establishment, a magnetic system would be preferable, at least in part because magnetic systems tend to be less expensive and because magnetic systems are more effective and efficient with the type of products in a supermarket. However, magnetic systems are more likely to be adversely affected by metallic fixtures, metal counters, metal shopping carts, noise generators such as laser product scanners and the like. Such nearby conditions may create signals of their own which interfere with the effective and efficient operation of a magnetic theft deterrent system.

In some installations where magnetic systems have been installed, it has been necessary to remove all nearby metal fixtures to minimize the possibility of such interference. Also the presence of a magnetic tag adjacent to but outside the control zone may result in a false alarm signal. Thus, magnetic systems, despite their many other advantages, have serious disadvantages in supermarket and like retail store operations. It would be desirable to have a magnetic system where such metal and ambient noise generators, although present, do not interfere with detection of the actual theft deterrent tags in the control zone.

In addition, since the aisle width of a supermarket through which the customer must pass is relatively narrow, it is advantageous that the article surveillance equipment, including transmitting and receiving antennas take up as little width space as possible in order not to impinge on normal passage through the aisle.

SUMMARY OF THE INVENTION

The present invention has as its primary object the provision of magnetic type article surveillance practices, systems and apparatus adapted for installation use in environments with high ambient noise and surrounding metals.

In departure from known article surveillance practices of the magnetic type, the invention attains such objective in particularly efficient manner by providing first and second diverse magnetic materials, the first for application to articles under surveillance and the second for shielding the control zone, and preselecting the first and second magnetic materials to have respective diverse timewise responsivity to the magnetic field in the control zone. Such field is established by a time-varying signal, which preferably is sinusoidal, having successive positive and negative excursions with a zero-crossover therebetween. A pulsed signal alternatively may be used. The first magnetic material, i.e., the tag or marker material, has principal responsivity to the magnetic field at or near the zero-crossover current of the time-varying signal.

The second magnetic material, i.e., the shielding material, desirably has principal responsivity to the magnetic field at or near the peaks of the positive and negative excursions of the time-varying signal.

The invention also includes the further steps of receiving signals indicative of such primary responsivities of the first and second magnetic materials, which are perturbations of the magnetic field, and of processing received signals to suppress any output alarm indication for received signal content attributable to such responsivity of the second magnetic material and to generate an output alarm indication for received signal content attributable to the responsivity of the first magnetic material.

The second magnetic material is selected to function as an effective shield, i.e., by reducing the intensity of the magnetic field in the back field, to exhibit the above-mentioned diverse timewise or principal responsivity, and to have low eddy current loss. In this respect, the second magnetic material resistivity is selected, for given permeability and the frequency of the time-varying signal, to provide a skin depth substantially in excess of the thickness of the shield provided thereby. Further, the second magnetic material is selected to have a saturation flux density greater than the maximum flux density produced in the shield due to positive and negative peak excursions of the magnetic field.

In instances where reduced back field provided by the second magnetic material is still at a level sufficient to permit undesired receiver alarming due to tags present in such back field, the invention includes an attenuator in combination with the magnetic shield. In preferred form, such attenuator, also termed an auxiliary shield, establishes eddy currents therein responsively to tag signals, to attenuate them. Here, attenuator thickness is selected such that attenuator eddy currents are not generated responsively to the field established by the time-varying signal, but selectively in response to the tag signals to be suppressed.

The attenuator is desirably a sheet of electrically conductive material and has a skin depth giving rise to eddy currents therein in response to receipt of harmonics of the tag signals. Skin depth may be in the range of the sheet thickness, i.e., equal to or fractionally larger or fractionally less than sheet thickness.

In a more particular method aspect, the invention defines a method for determining the presence of a magnetic article surveillance tag in a control zone which is part of a much larger area, the method comprising the steps of: selecting an alternating excitation signal for establishing a magnetic field and having current peaks at positive and negative levels and a zero-crossover therebetween; selecting tag magnetic material of character responsive to the magnetic field in principal amplitude generally at or near such zero-crossovers; selecting magnetic shielding material of character responsive to the magnetic field in principal amplitude other than at or near such zero-crossovers; disposing shield members, each including the shielding material, at side margins of the control zone; establishing the magnetic field within the control zone; and processing signals received from the shielding material and the tag material to suppress any output alarm indication for received signal content attributable to the shielding material and to generate output alarm indication for received signal content attributable to the tag material in the control zone.

In further method aspects, the invention involves the selections of the materials to have skin depths as noted above for the magnetic shield and for the attenuator.

Systems according with the invention implement the basic and preferred methods above summarized. Preferred shielding members in accordance with the invention incorporate pressed powdered metal, ferrite or materials with similar properties.

The foregoing and other objects and features of the invention will be further understood from the following detailed description of preferred methods, systems and apparatus in accordance therewith and from the drawings wherein like reference numerals identify like parts and components throughout.

DETAILED DESCRIPTION OF PREFERRED PRACTICES AND EMBODIMENTS

Figure 1:
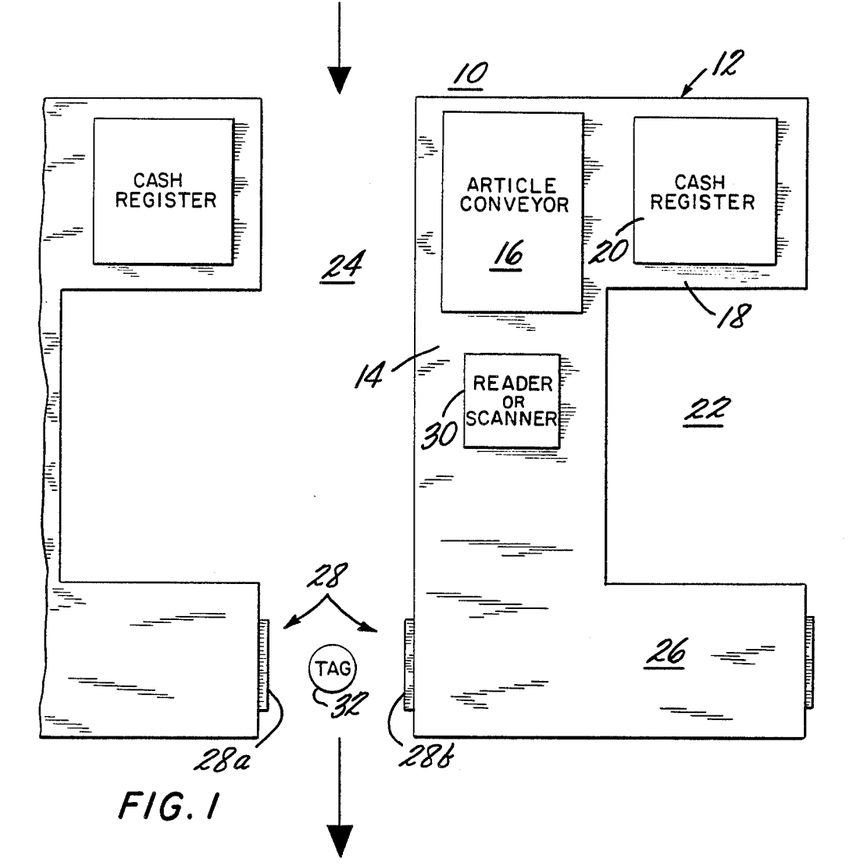
FIG. 1 is a plan view of a facility in which the invention is implemented.

Referring to FIG. 1, facility 10 may be a supermarket checkout area having a plurality of checkout counters, one being identified as 12 and including checkout counter 14, article conveyor 16, checkout station 18 having cash register 20, operator area 22, aisle 24 and bagging station 26.

Articles for checkout, comprising those selected for purchase by a customer, are placed on conveyor 16 upstream of article surveillance unit 28 and transported by conveyor 16 to checkout station 18. The operator at work station 22 may deactivate the magnetic marker or tag attached to the articles issuing from conveyor 16 and passes same over UPC (universal product code) reader or scanner 30 to input price information from the facility computer (not shown) into register 20. Marker deactivation may of course take place automatically in the course of transit of articles on conveyor 16 to station 22 or in the course of checkout.

Unit 28 includes transmit/receive subunits 28a and 28b across aisle 24 as shown. Each of the subunits may contain transmitting and receiving antennae. Should a customer take an article having a tag 32 attached thereto and advance same through the control zone defined by subunits 28a and 28b, such subunits will respond to the presence of the tag in the control zone by initiating output alarm indication. As will be appreciated, the control zone is defined by the space between subunits 28a and 28b.

Manifestly, tagged articles outside the control zone, and adjacent noise sources, should not generate output alarm indication. Further, tagged articles that are not deactivated should freely pass around behind subunit 28b such that they do not activate the alarm.

In commonly-assigned pending application Ser. No. 675,005, filed on Nov. 26, 1984, now U.S. Pat. No. 4,660,025, issued on Apr. 21, 1987, a magnetic tag or marker is disclosed which is usable in practicing the invention herein. Such '005 marker has a hysteresis loop having large Barkhausen discontinuity. That is, the hysteresis loop is characterized by essentially step changes or regenerative reversal of magnetic polarization as it is subjected to positive and negative magnetic field excursions. The tag responses attending such step changes are particularly rich in high harmonics, readily distinguishable from responses from other magnetic objects which may be within the reach of the generated field. As is described in detail in another commonly-assigned pending application, Ser. No. 761,611, filed on Aug. 1, 1985, now U.S. Pat. No. 4,686,516, issued on Aug. 11, 1987, tags of the '005 type are readily deactivated.

Satisfactory results are obtainable with amorphous wire markers having the following compositions:

(a) $Fe_{81} Si_4 B_{14} C_1$;
(b) $Fe_{81} Si_4 B_{15}$; and
(c) $Fe_{77.5} Si_{7.5} B_{15}$.

It is believed that a wide range of such materials can be used, all falling within the general formula:

$$Fe_{85-x} Si_x B_{15-Y} C_y,$$

where the percentages are in atomic percent, x ranges from about 3 to 10, and y ranges from about 0 to 2. The wire markers are made so that they preferably have a retained stress therein and have a hysteresis loop characteristc exhibiting a large Barkhausen discontinuity.

Figure 2:
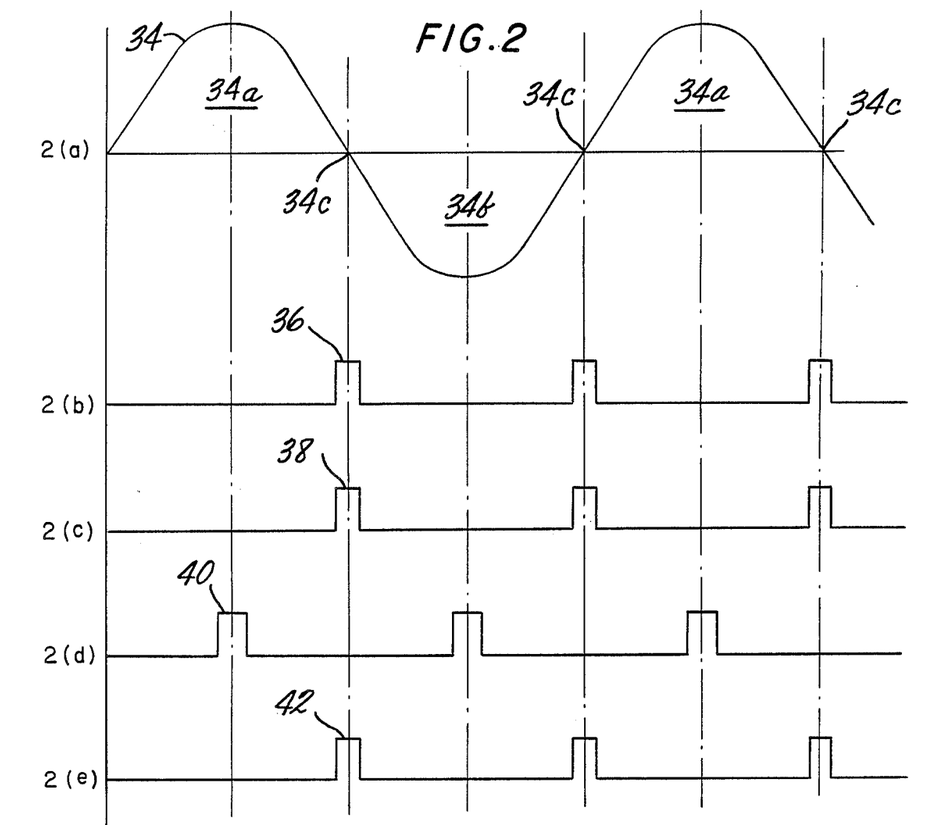
FIGS. 2(a)–2(e) are timing diagrams of signals indicative of the practices of the invention and of practice averted thereby.

Referring now to FIG. 2(a), curve 34 is the current vs. time excitation of transmitting coils of subunits 28a and 28b, and has positive excursions 34a, negative excursions 34b and zero-crossovers 34c. Curve 34 is preferably alternating and sinusoidal.

FIG. 2(b) indicates the response 36 of a tag having the above-discussed magnetic material to the field excitation or transmission of FIG. 2(a). The tag thus introduces a perturbation in the field through its above-discussed step change, occurring relatively closely in time with zero-crossover 34c of the excitation signal 34. The response is detectable in a receiver as being rich in higher harmonics, as noted above, and is thereby readily discernible.

In accordance with the invention, to minimize the possibility of false signals from tags that are outside the control zone, or from other metal objects near the control zone, shielding is introduced to reduce substantially the intensity of the back field, i.e., the magnetic field outside the control zone. The shielding should preferably be of a material and a design such that the intensity of the back field is reduced sufficiently to lessen the likelihood of tags located in the back field or other metal objects in the back field causing an alarm condition. Thus, the overall reduction in back field intensity is a function of the particular system being used and its requirements. In the preferred embodiment discussed herein, the overall reduction in intensity of the back field, when measured in gauss, is such that the ratio of the peak front field to the peak back field is at least about ten to one. It has been found that shields made from ferrites and pressed powdered iron are satisfactory to reduce the backfield sufficiently to minimize responses from tags in such backfield. Also, a laminated or nonlaminated magnetic sheet material with the appropriate parameters can satisfy the desired front field to back field ratio.

It is also important that the shield material should not itself respond to the exciting field by creating perturbations which cause false alarms or otherwise interfere with detection of the perturbations caused by an active tag in the control zone. However, magnetic materials do respond to an exciting field by creating perturbations. Therefore, it is necessary that perturbations created by the shielding be relatively low in amplitude or, if large enough to give a false signal, such signals should be of such nature as to be readily distinguished or blocked or suppressed.

Certain ferrites have been found to produce perturbations 38 having relatively large principal amplitudes at or near the zero-crossover point 34(c) of the current in the excitation coil, as shown in FIG. 2(c). This is generally time-coincident with the response of the tag, as shown in FIG. 2(b), and could lead to a false alarm condition even when no tag is present in the control zone. It is also found that these ferrites have saturation flux density and a coercive force that are relatively low for the system application herein.

On the other hand, other ferrite material is usable in practicing the invention, for example, a ferrite of TDK Corporation of Tokyo, Japan, identified commercially as $Q_5B$. This material exhibits magnetic characteristics of value desirable herein, e.g., a permeability of 100, plus or minus 25%, a saturation flux density of 3.4 kilogauss, a residual flux density of 1.9 kilogauss, a coercive force of 3.6 oersted, and a resistivity of $10^4$ ohm-cm. A suitable form of such material for use in tiled shields, discussed below, is a pressed square tile of 10 cm., 5 mm. in thickness, having volumetric density of 4.7 grams per cubic centimeter.

A shield made from pressed powdered iron also has excellent properties to achieve the results desired. The preferred pressed powdered iron that has been successfully employed in a particular system, described hereinafter, is also a commercial composition having about 99 percent iron with about one percent trace elements including FeP, $H_2$, C, Mn, S and perhaps minute amounts of other elements. The powdered iron herein, however, is preferably not sintered and is pressed at about 40–50 tons per square inch to a volumetric density of about 6.9 grams per cubic centimeter. This material has a coercive force of about 6.6 oersted and a residual flux density of about 2.2 kilogauss. Permeability is preferably initially at about 75, but varies with the excitation field strength by about a factor of two over the excitation range. If permeability of the shield is substantially less than 60 the material begins to lose its shielding effect and the back field intensity may increase to an objectionable level. Resistivity of the material is about 1.0 ohm-cm. Saturation flux density is about 15 kilogauss.

Turning from these specific characteristics of the illustrative ferrite and pressed powdered iron shield materials, two general characteristics for a desirable magnetic shield material are saturation flux density and skin depth. Saturation flux density should be greater than the maximum flux density produced in the shield due to positive and negative excursions of the magnetic field.

Skin depth is defined as that distance below the surface of a conductor where the current density has diminished to 1/e of its value at the surface, e being the natural logarithm base. The equation for determining skin depth ($\delta$, delta) is as follows:

$$\delta = \frac{1}{\left(\frac{\pi u f}{\rho}\right)^{\frac{1}{2}}}, \quad (1)$$

where u is the material permeability in Henries per meter, f is the transmitter operating frequency in Hertz and $\rho$ is the material resistivity in ohm-meters.

In practice under the invention, magnetic shield eddy current loss is to be minimized to avert collapse of the control zone field. In attaining this, the resistivity $\rho$ in ohm-meters of the shield material is preferably as in the following inequality:

$$\rho > \pi d^2 u f \quad (2),$$

where d is the sheet thickness of the shield in meters. Resistivity of the shield material is accordingly selected to be greater than the product of permeability, frequency, the square of sheet thickness and pi. The result of such practice is that skin depth is substantially greater than sheet thickness, e.g., a multiple thereof, and shield eddy currents are made nil.

The inequality (2) may also be expressed as:

$$\frac{\rho}{u} > \pi d^2 f. \quad (3)$$

It will be seen that the inequality may be maintained with higher resistivity materials having higher permeability, and vice versa. Thus, for a given operating frequency and specified allowable shield sheet thickness, one may look jointly to resistivity and permeability, particularly the ratio of the former to the latter, in minimizing eddy currents.

Where the magnetic shield is a laminate of a plurality of thin sheets glued together and electrically isolated from one another, the skin depth of each such sheet is made substantially greater than the sheet thickness.

A further general characteristic of the magnetic shield material, noted above, is that it have responsivity to the magnetic field in the control zone which is timewise diverse from the responsivity of the tag magnetic material to the field.

A magnetic shield made from the above discussed pressed powdered iron, yields a perturbation response which has a principal amplitude 40 at a time other than near the current zero-crossover point, as shown in FIG. 2(d). The magnetic response of the preferred pressed powdered iron shielding actually occurs at or near the time of the peaks of the transmitting coil current excitation. Thus, the tag response and the principal magnetic shield response to the incident field are timewise distinct, thereby permitting the unique discernment of the tag response 36 as shown in FIG. 2(b) without interference from the perturbations 40 from the magnetic shield.

The TDK ferrite material as a magnetic shield also effects such timewise distinct response, permitting distinct discernment of tag responses.

It should be noted that even with a significant reduction of peak back field intensity as compared to the peak front field, it is still possible that a magnetic tag located within this weak back field may cause an alarm condition. To lessen this possibility, it has been found that placing a thin auxiliary shield of electrically conductive material, for example, aluminum or copper, behind the magnetic shield serves to attenuate, through eddy current losses in the auxiliary shield, the perturbations from magnetic tags located in the back field to a point where such perturbations are not sufficiently strong to create an alarm condition.

In attaining such attenuation of back field tag perturbations, practice under the invention provides the opposite effect of that above discussed in connection with the magnetic shield, i.e. the auxiliary shield is selected to have skin depth giving rise to eddy-current generation. Contrary to inequality (2) above, in providing the auxiliary shield, one selects material resistivity, in relation to the tag frequencies of concern and material permeability, to place skin depth in the range of sheet thickness, i.e., equal to or fractionally larger or fractionally less than sheet thickness. Thus, if inequality (2) is made to be an equation, skin depth is equal to sheet thickness.

By way of example, the auxiliary shield is made of aluminum of thickness 0.020 inch, and the detected tag response has signal content over a spectrum inclusive of ten kilohertz and above. The shield skin depth at ten kilohertz for the aluminum sheet is 0.032 inch. An attenuation factor of 0.54 applies to the ten kilohertz tag signal content. Further attenuation of the tag signal takes place at the magnetic shield, which will shunt magnetic flux line content of the tag signal. As a result of such magnetic shield attenuation, it is found that tag responses in the back field are suppressed with the 0.020 inch sheet and that an 0.032 sheet depth (equal to skin depth) is not required, thus providing a less expensive auxiliary shield.

In addition to its eddy current attenuating function, the auxiliary shield may be grounded to then function also as an electrostatic shield, shunting to ground low frequency electrostatic noise.

Figure 3:
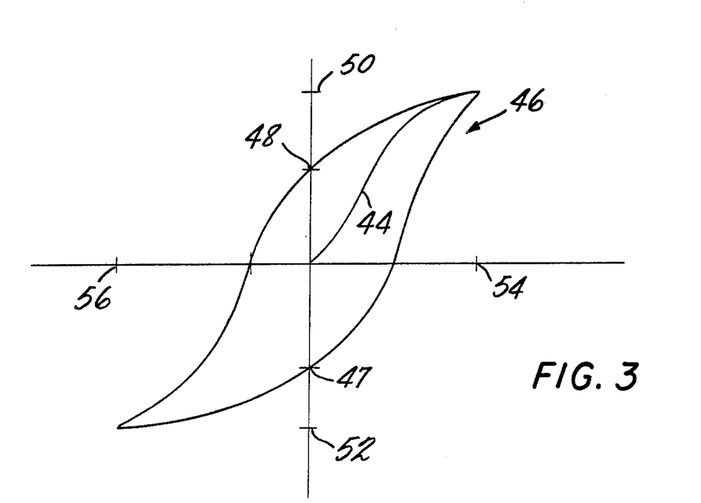
FIG. 3 is a plot of magnetic characteristics of a preferred magnetic material usable in the shielding member of the invention.

FIG. 3, not drawn to scale, shows the magnetization curve 44 for the above discussed powdered metal shield of the invention and its hysteresis loop 46. Various points along and outside of curve 46 are indicated, as follows: 47, 48, representing the residual flux density (Br) at about 2.2 kilogauss; 50, 52, respectively representing the positive and negative saturation flux density at about 15 kilogauss; and 54, 56, respectively representing the coercive force at about 6.6 oersted.

Figure 4:
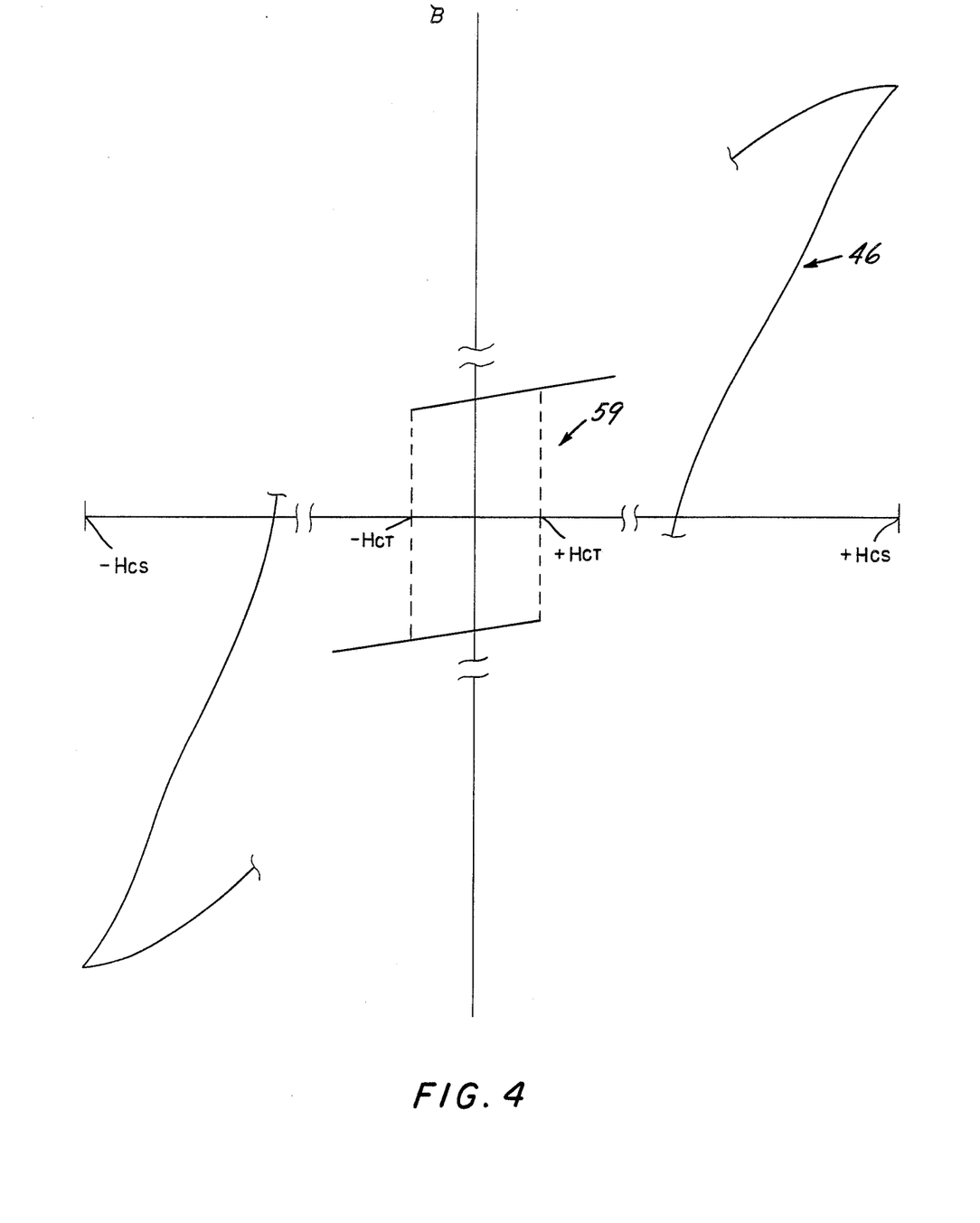
FIG. 4 shows the hysteresis loop of a tag material and that of a shielding material the axes of the plot being broken to permit such joint display.

FIG. 4 shows the portions of the shield material hysteresis loop 46 at its positive and negative saturation extremities, and the curve is otherwise omitted. Breaks are provided in both axes of the plot to permit joint display of the hysteresis loop curve 59 of the tag material of the '005 application above discussed. The coercive force for the tag material ($-H_{ct}$ and $+H_{ct}$) may be a fraction of an oersted, e.g., 0.6. The coercive force $H_{cs}$ for the shielding material may be in excess of about one oersted. In accordance with the invention, method steps are provided in magnetic article surveillance wherein one (1) selects a magnetic field having certain parameters, i.e., of alternating nature and given maximum field strength, (2) selects tag material to have a coercive force less than the maximum field strength and (3) selects shielding material to have a coercive force greater than the maximum field strength and to effect back field reduction. Conversely, one can select the tag and shield material parameters and then set maximum field strength to a level exceeding the tag material coercive force and less than the coercive force of the shielding material.

Figure 5:
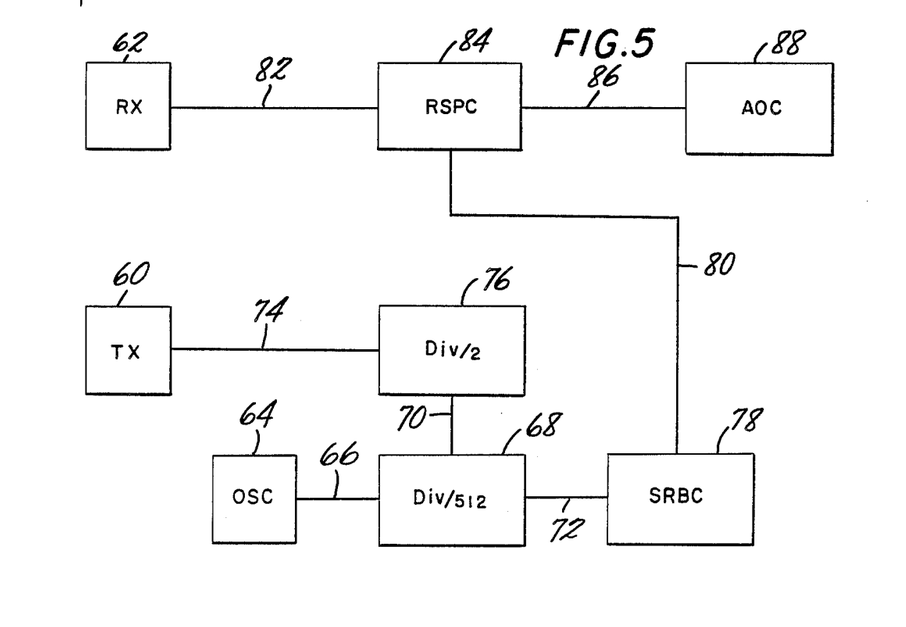
FIG. 5 is a functional block diagram of the transmitting and receiving subsystems of the invention.

FIG. 5 shows a functional block diagram of one example of a harmonic system in accordance with the invention, including transmitting antennae and associated circuitry (TX) 60 and receiving antenna and associated filtering circuitry (RX) 62. System oscillator (OSC) 64 may operate to provide an output signal on line 66 at a frequency of 54,272 hertz. Divider (DIV/512) 68 divides the line 66 signal by 512, providing a signal on lines 70 and 72 at 106 hertz. The line 70 signal is coupled to divider (DIV/2) 76, a divide by two circuit, and its output is furnished over line 74 to transmitting antenna and associated circuitry 60, thus placing the excitation signal 34 of FIG. 2(a) at a frequency of 53 hertz.

The line 72 signal, which is at 106 hertz, is applied to shielding response blanking circuit (SRBC) 78, which provides an output on line 80 having ON pulses coincident with the response period of the shielding material to the incident field. The timing of this signal is the same as that shown in FIG. 2(d).

Receiving antennae and associated circuitry 62 applies its output signals over line 82 to receiver suppression and passage circuit (RSPC) 84, which is responsive to the line 80 signal to null circuit 84 output line 86 during periods in which the signal content of line 82 is attributable to shielding material response, thereby suppressing output alarm indication which would otherwise be provided by alarm output circuitry (AOC) 88. RSPC 84 passes signal content of line 82 to circuitry 88 at other times, particularly where its signal content is attributable to tag material response, and thereby causes line 86 to provide input to AOC 88, as per FIG. 2(e), generating output alarm indication.

It is to be understood that systems other than the one described above, including pulsed systems not necessarily of the harmonic type, may be used in accordance with the invention.

Figure 6:
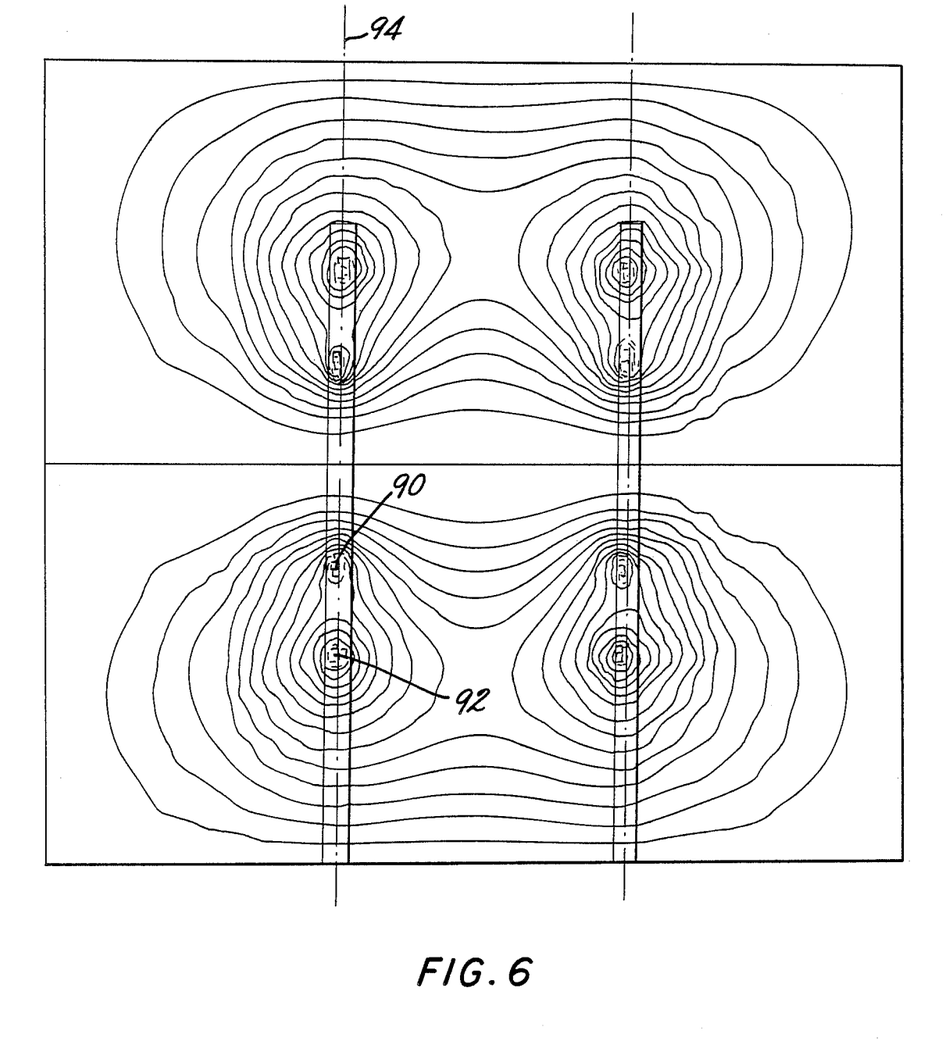
FIG. 6 is a computer-generated graphic diagram of a magnetic field generated by two concentric transmitting antenna loops without shielding.
Figure 7:
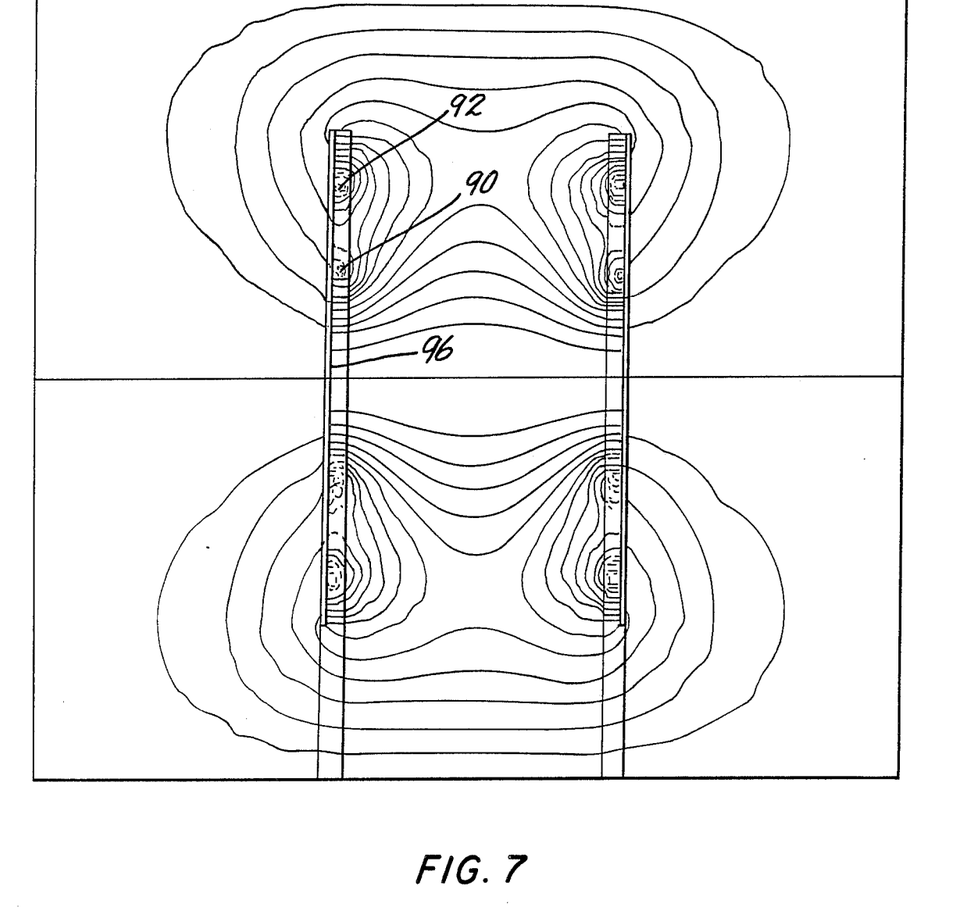
FIG. 7 is a computer-generated graphic diagram of the magnetic field shown in FIG. 6 influenced by shielding in accordance with the invention.

To illustrate generally the reduction in the back field intensity by the use of the invention, FIG. 6 is a computer-generated plot of the magnetic field associated with two concentric transmitting coils, shown in section at 90, 92 along radial axis 94. FIG. 7 is a like computer-generated plot of the magnetic field associated with coils 90, 92, however, with a shield having magnetic shielding material with parameters above outlined. The magnetic field rearwardly (in a direction away from the intended control zone) of the transmitting antenna is referred to as the back field. The front field is the magnetic field in the control zone which is between the right and left transmitting antennas. As is seen, substantial back field reduction occurs over that applying in the absence of the shield. The shield thus provides a return path 96 along axis 94 for large numbers of the most intense flux lines emanating forwardly from coils 90 and 92 into the desired control zone, whereby flux lines present in the installation outside of the control zone are reduced.

Figure 8:
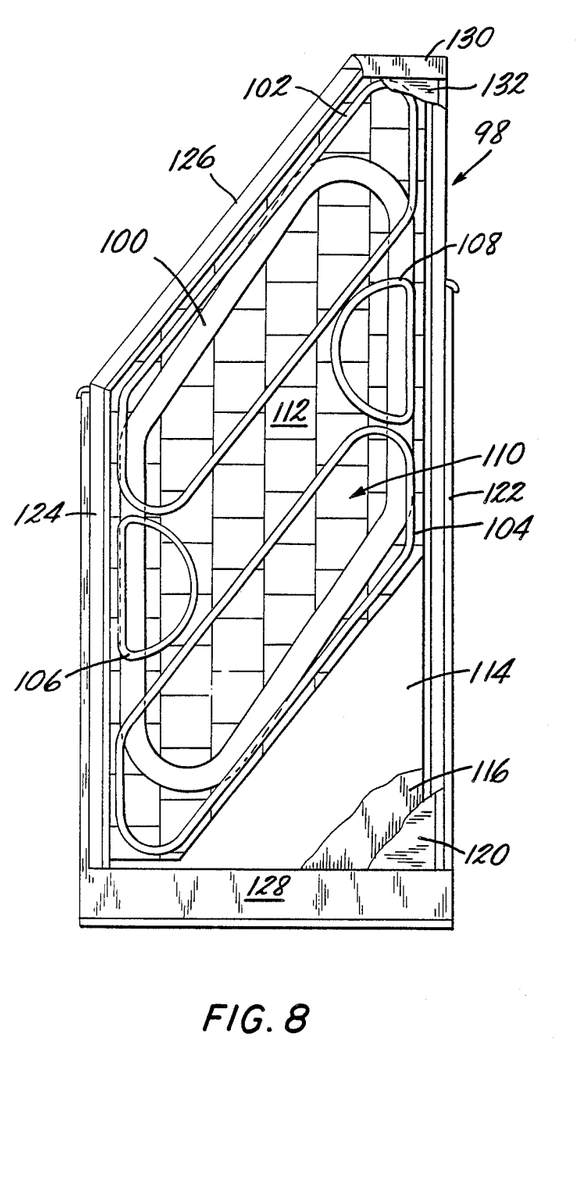
FIG. 8 is a front elevation of a transmitting and receiving pedestal including a shielding member in accordance with the invention.
Figure 9:
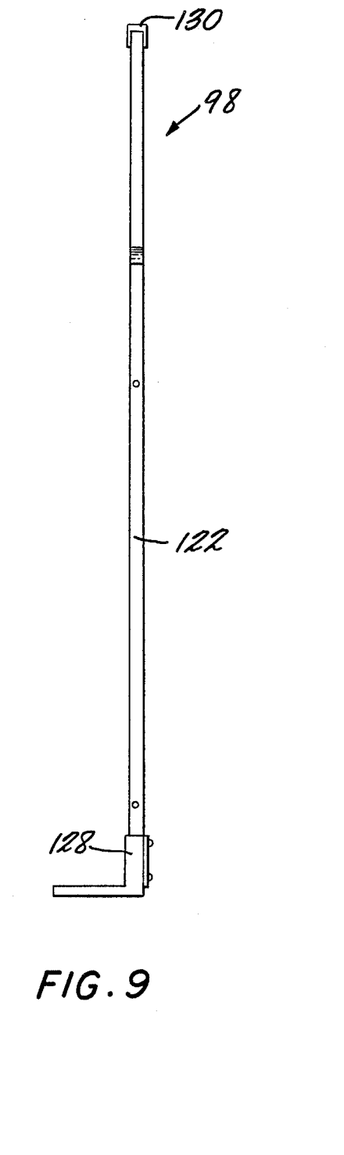
FIG. 9 is a side elevation of the FIG. 8 pedestal as would be seen from the right side of FIG. 8.

FIGS. 8 and 9 show one embodiment for pedestals containing transmitting and receiving antennae. Pedestal 98 may be an upstanding unit located at a first side margin of the control zone opposite another such unit disposed at the other or second side margin of the control zone. Pedestal 98 includes transmitting coil 100 and receiving coils 102, 104, 106 and 108. Immediately rearwardly of this antenna arrangement is the magnetic shield material which may be a matrix 110 formed of horizontally and vertically interleaved tile-like elements 112, each comprised of the above discussed pressed powdered iron. In forming the tiles, the shielding material is provided in a square of size 3.5 inches, pressed by a 500 ton press.

The individual tiles 112 comprising matrix 110 are glued to one another at all perimeters thereof and are further glued to support member 114 to avoid vibration or relative motion therebetween. Based on the interleaving in horizontal and vertical directions, one minimizes the adverse effects of true out-of-square shape of individual tiles.

It is to be understood that the magnetic shielding material may, of course, be made of a single sheet material or laminated sheet material if convenient and practicable. In addition, the magnetic shield material may be made by processes other than pressing, such as injection molding, plasma, flame spraying, etc. An auxiliary eddy current shield may also be included in the preferred embodiment. This may be achieved by providing a material such as an aluminum sheet 116 of 0.020 inch in thickness is applied to the rearward side of support member 114. This auxiliary shield member attenuates signals that may be generated by an active tag located in the back field, as above discussed. Transmitting coil 100 may be glued to the front side of matrix 110. A member (not shown), of thickness equal to that of coil 100 and having a cutout corresponding to the geometry of coil 100, may be glued to matrix 110 with the cutout in registry with coil 100. If desired, this filler material may be replaced with structural foam. The receiving coils 102, 104, 106 and 108 may be glued to such cutout member. A second support member 120 is assembled over the receiving coils and includes adhesive for engaging the receiving coils and the cutout member.

Support members 114 and 120 may be of masonite and reside in channels formed in metal extrusions 122, 124 and 126 to which the support members are secured by fasteners. The extrusions are supported by base 128 and a capped plastic insulation piece 130 is disposed between extrusions 122 and 126.

Abrasion-resistant plastic sheets, one shown at 132, are applied respectively over aluminum sheet 116 and support member 120 to complete the pedestal and the interior may be filled with a structural foam. The entire thickness of each pedestal can be less than one inch, thus collectively occupying less than two inches of transverse aisle space.

Figure 10:
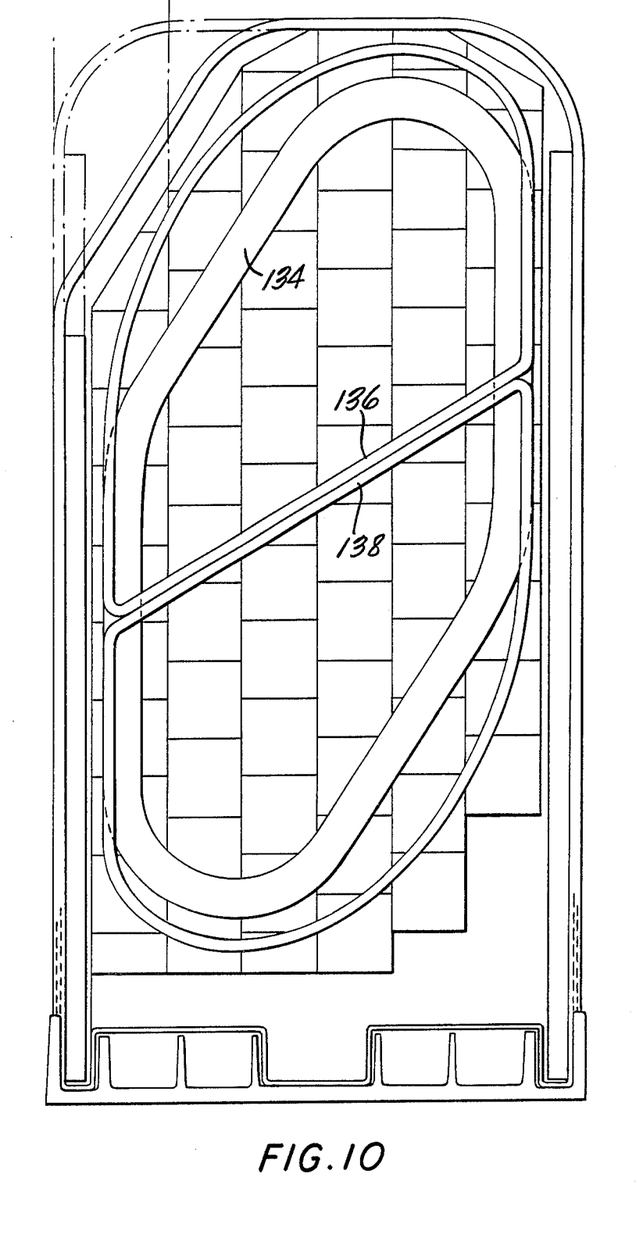
FIG. 10 is a front elevation of an alternative pedestal and coil arrangement from that shown in FIG. 8.

FIG. 10 shows a further pedestal embodiment, which is somewhat more compact than that of FIGS. 8 and 9. Transmitter coil 134 here is employed with only two receiver coils 136 and 138 which abut one another centrally of coil 134.

Various changes to the foregoing system and apparatus and modifications to the described method may be introduced without departing from the invention. Thus, the particularly discussed and depicted embodiments and practices are intended in an illustrative and not in a limiting sense. The true spirit and scope of the invention is set forth in the following claims.

I claim:

1. In a method for effecting article surveillance by the use of a time-varying signal establishing a magnetic field, the steps of providing first and second diverse magnetic materials, the first for application to articles under surveillance and the second for shielding said field, and preselecting said first and second magnetic materials to have respective diverse timewise responsivity to said magnetic field.

2. The method claimed in claim 1 wherein said time-varying signal has successive positive and negative excursions with a zero-crossover therebetween, said first magnetic material having principal responsivity to said magnetic field near said zero-crossover of said time-varying signal.

3. The method claimed in claim 2 wherein said second magnetic material has principal responsivity to said magnetic field near the peaks of said positive and negative excursions of said time-varying signal.

4. The method claimed in claim 3 including the further step of receiving signals indicative of such responsivities of said first and second magnetic materials to said magnetic field, and of processing such received signals in manner suppressing surveillance output alarm indication for received signal content attributable to such responsivity of said second magnetic material and generating surveillance output alarm indication for received signal content attributable to said responsivity of said first magnetic material.

5. The method claimed in claim 1 wherein said second magnetic material is configured as a shield, said second magnetic material being selected to minimize eddy current generation in said shield responsively to said magnetic field.

6. The method claimed in claim 5 wherein said second magnetic material is selected to have a saturation flux density greater than the largest flux density produced in such shield responsively to said magnetic field.

7. The method claimed in claim 1 wherein said second magnetic material is configured as a shield, the resistivity of said second magnetic material being selected to be greater than the product $\pi d^2 u f$, where d is shield thickness, u is the permeability of said second magnetic material and f is the frequency of said time-varying magnetic signal.

8. The method claimed in claim 1 wherein said second magnetic material is configured as a shield, the skin depth of said shield being a multiple of said shield thickness.

9. The method claimed in claim 1 wherein said second magnetic material is selected to have a saturation flux density greater than the largest flux density produced in such shield responsively to said magnetic field.

10. The method claimed in claim 1 wherein said second magnetic material bounds a control zone for such surveillance, said method including the further steps of providing an auxiliary shield of electrically conductive character and juxtaposing said auxiliary shield with said second magnetic material outwardly of said control zone, the material of said auxiliary shield being selected to effect eddy current generation in said auxiliary shield responsively to signals generated by said first magnetic material located outwardly of said control zone.

11. The method claimed in claim 10 wherein the resistivity of said auxiliary shield material is selected to be equal to or fractionally larger or fractionally less than the product $\pi d^2 uf$, where d is auxiliary shield thickness, u is the permeability of said auxiliary shield material and f is a frequency in said signals generated by said first magnetic material.

12. The method claimed in claim 10 wherein the skin depth of said auxiliary shield is in the range of being equal to or fractionally larger or less than the thickness of said auxiliary shield.

13. A method for determining the presence of a magnetic article surveillance tag selectively in a control zone, said method comprising the steps of:
  (a) selecting an alternating transmitting excitation signal for establishing a magnetic field for such surveillance and having current peaks at positive and negative levels and a zero-crossover therebetween;
  (b) selecting tag magnetic material of character responsive to said magnetic field in maximum amplitude near such zero-crossovers;
  (c) selecting magnetic shielding material of character responsive to said magnetic field in maximum amplitude other than at such zero-crossovers;
  (d) disposing magnetic shield members comprised of said magnetic shielding material at side margins of said control zone;
  (e) establishing said magnetic field locally interiorly of said shield members; and
  (f) processing signals received from said shielding material and said tag material in manner suppressing surveillance output alarm indication for received signal content attributable to such shielding material and generating surveillance output alarm indication for received signal content attributable to said tag material.

14. The invention claimed in claim 13 wherein said step (b) is practiced by selecting said magnetic shielding material of character responsive to said magnetic field in maximum amplitude near such positive and negative peaks.

15. The invention claimed in claim 14 wherein said step (b) is further practiced to provide a ratio of peak magnetic front field to back field of at least ten to one.

16. The method claimed in claim 13 wherein said magnetic shielding material is selected to minimize eddy current generation in said magnetic shield members responsively to said magnetic field.

17. The method claimed in claim 13 wherein said magnetic shielding material is selected to have a saturation flux density greater than the largest flux density produced in said magnetic shield members responsively to said magnetic field.

18. The method claimed in claim 13 including the further steps of providing an auxiliary shield of electrically conductive character and juxtaposing said auxiliary shield with at least one of said magnetic shield members outwardly of said control zone, the material of said auxiliary shield being selected to effect eddy current generation in said auxiliary shield responsively to signals generated by said tag magnetic material located outwardly of said control zone.

19. A system for use in determining the presence of a magnetic article surveillance tag selectively in a control zone, said system comprising:
  (a) means for establishing an alternating magnetic field in said control zone by use of an excitation signal having current peaks at positive and negative levels and a zero-crossover therebetween;
  (b) magnetic shielding material of character responsive to said magnetic field in maximum amplitude other than near such zero-crossovers;
  (c) magnetic shield members at side margins of said control zone and comprised of said magnetic shielding material; and
  (d) processing means for receiving signals from said shielding material and processing same in manner suppressing surveillance output alarm indication for received signal content attributable to such shielding material.

20. The system claimed in claim 19 wherein said magnetic shielding material is of character responsive to said magnetic field signal in maximum amplitude generally near such positive and negative peaks.

21. The system claimed in claim 19 wherein said magnetic shielding material provides a ratio of peak magnetic front field to back field of at least ten to one.

22. The system claimed in claim 19 wherein said magnetic shield members are operative to minimize eddy current generation in said shield responsively to said magnetic field.

23. The system claimed in claim 19 wherein the resistivity of said magnetic shielding material is greater than the product $\pi d^2 uf$, where d is shield member thickness, u is the permeability of said magnetic shielding material and f is the frequency of said time-varying magnetic signal.

24. The system claimed in claim 19 wherein the skin depth of said shield members is a multiple of the shield member thickness.

25. The system claimed in claim 19 wherein said magnetic shielding material has a saturation flux density greater than the largest flux density produced in said shield members responsively to said magnetic field.

26. The system claimed in claim 19 including further an auxiliary shield of electrically conductive material juxtaposed with at least one of said magnetic shield members outwardly of said control zone, the material of said auxiliary shield effecting eddy current generation in said auxiliary shield responsively to signals generated by article surveillance tags located outwardly of said control zone.

27. The system claimed in claim 26 wherein the resistivity of said auxiliary shield material is selected to be equal to or fractionally larger or fractionally less that the product $\pi d^2 uf$, where d is auxiliary shield thickness, u is the permeability of said auxiliary shield material and f is a frequency in said signals generated by said tags responsively to said magnetic field.

28. The system claimed in claim 26 wherein the skin depth of said auxiliary shield is in the range of being equal to or fractionally larger or fractionally less than the thickness of said auxiliary shield.

29. Shielding apparatus for use in a system for determining the presence of magnetic article surveillance tags selectively in a control zone, said system employing a time-varying signal of preselected frequency to establish a magnetic field in said control zone, said shielding apparatus comprising:
  (a) a first shield including magnetic material having a skin depth minimizing eddy current generation in said first shield responsively to said magnetic field; and
  (b) a second shield including electrically conductive material having a skin depth effecting eddy current generation in said second shield responsively to signals generated by said tags responsively to said magnetic field.

30. The apparatus claimed in claim 29 wherein the resistivity of said first shield material is greater than the product $\pi d^2 uf$, where d is first shield thickness, u is the permeability of said first shield material and f is the frequency of said time-varying signal.

31. The apparatus claimed in claim 29 wherein the skin depth of said first shield is a multiple of the first shield thickness.

32. The apparatus claimed in claim 29 wherein the resistivity of said second shield material is equal to or fractionally larger or fractionally less than the product $\pi d^2 uf$, where d is second shield thickness, u is the permeability of said second shield material and f is a frequency of signals generated by said tags.

33. The apparatus claimed in claim 29 wherein the skin depth of said second shield is in the range of being equal to or fractionally larger or fractionally less than the thickness of said second shield.

34. Apparatus for use in a system for determining the presence of a magnetic article surveillance tag selectively in a control zone, said system being of type including means for generating a magnetic field by use of alternating excitation signal having current peaks at positive and negative levels and a zero-crossover therebetween, said apparatus comprising:
  (a) a shielding member including magnetic shielding material of character responsive to said excitation signal in maximum amplitude other than near such zero-crossovers;
  (b) a transmitting antenna juxtaposed with said shielding member and adapted for establishing a magnetic field responsively to said excitation signal; and
  (c) a receiving antenna juxtaposed with said shielding member and adapted to be responsive to perturbations induced in said magnetic field by said shielding member and said tag.

35. The apparatus claimed in claim 34 further including an auxiliary shielding member of electrically conductive material, said magnetic shielding material being situated between said auxiliary shielding member and said transmitting and receiving antennas.

36. The apparatus claimed in claim 34 wherein the resistivity of said magnetic shielding material is greater than the product $\pi d^2 uf$, where d is shielding member thickness, u is the permeability of said magnetic shielding material and f is the frequency of said excitation signal.

37. The apparatus claimed in claim 34 wherein the skin depth of said shielding members is a multiple of the shielding member thickness.

38. The apparatus claimed in claim 34 wherein said magnetic shielding material has a saturation flux density greater than the largest flux density produced in said shielding member responsively to said magnetic field.

39. The apparatus claimed in claim 34 including further an auxiliary shield of electrically conductive material juxtaposed with said shielding member outwardly of said control zone, the material of said auxiliary shield effecting eddy current generation in said auxiliary shield responsively to signals generated by article surveillance tags located outwardly of said control zone.

40. The apparatus claimed in claim 39 wherein the resistivity of said auxiliary shield material is selected to be equal to or fractionally larger or fractionally less than the product $\pi d^2 uf$, where d is auxiliary shield thickness, u is the permeability of said auxiliary shield material and f is a frequency in said signals generated by said tags responsively to said magnetic field.

41. The apparatus claimed in claim 39 wherein the skin depth of said auxiliary shield is in the range of being equal to or fractionally larger or fractionally less than the thickness of said auxiliary shield.

42. An electronic article surveillance system to detect the presence of a magnetic article surveillance tag in a control zone, comprising:
  (a) transmitter means for transmitting alternating magnetic energy into said control zone;
  (b) receiving means for detecting perturbations of said magnetic energy caused by the presence of magnetic tags within said control zone;
  (c) signal processing means connected to said receiving means to cause an alarm condition when said active tag is in said control zone;
  (d) a shield member located at a side margin of said control zone;
  (e) said shield member comprising magnetic shield material being of composition to reduce the intensity of magnetic energy in the back field located in a zone behind said shield member to lessen the probability of objects in said back field causing an alarm condition;
  (f) said magnetic shield material being of composition to produce principal perturbations of said magnetic energy which are detectably distinguishable from the perturbations caused by said magnetic tag;
  (g) said signal processing means being adapted to suppress said principal perturbations caused by said magnetic shield material to preclude an alarm condition from said magnetic shield perturbations.

43. The invention claimed in claim 42 where said shield member also includes an auxiliary shield located behind said magnetic shield material to attenuate perturbations resulting from the presence of a magnetic tag in said back field thereby to lessen the likelihood of said perturbations from said backfield from generating an alarm condition.

44. The invention claimed in claim 43 wherein said auxiliary shield is comprised of aluminum.

45. The invention claimed in claim 42 wherein said magnetic shield material has a relative permeability of greater than or equal to about 60.

46. The invention claimed in claim 42 wherein said magnetic shield member has a saturation flux density greater than the largest flux density produced in the shield member due to the positive or negative peak excursions of said transmitted magnetic energy.

47. The invention claimed in claim 42 wherein said magnetic shield member has a coercivity of equal to or greater than about one oersted.

48. The invention claimed in claim 42 wherein said magnetic shield member is comprised of pressed powdered iron.

49. The invention claimed in claim 42 wherein said magnetic shield material produces principal perturbations of said transmitted magnetic energy at a time other than near the zero cross-over point of a current cycle causing said transmitted magnetic energy.

50. The invention claimed in claim 42 wherein said magnetic shield member is comprised of a ferrite.

* * * * *

UNITED STATES PATENT AND TRADEMARK OFFICE
CERTIFICATE OF CORRECTION

PATENT NO. : 4,769,631

DATED : September 6, 1988

INVENTOR(S) : Richard L. Copeland

It is certified that error appears in the above-identified patent and that said Letters Patent is hereby corrected as shown below:

Col. 3, line 31, change "material the" to -- material, the --.
Col. 5, line 48, change "mm." to -- cm. --.
Col. 6, line 32, change ">" to -- >> --.
Col. 6, line 44, change ">" to -- >> --.

Signed and Sealed this

Seventh Day of March, 1989

Attest:

DONALD J. QUIGG

Attesting Officer

Commissioner of Patents and Trademarks